US009424067B2

(12) United States Patent
Liguori et al.

(10) Patent No.: US 9,424,067 B2
(45) Date of Patent: Aug. 23, 2016

(54) MANAGING VIRTUAL MACHINE INSTANCES UTILIZING AN OFFLOAD DEVICE

(71) Applicant: Amazon Technologies, Inc., Seattle, WA (US)

(72) Inventors: Anthony Nicholas Liguori, Bainbridge Island, WA (US); Matthew Shawn Wilson, Seattle, WA (US); Ian Paul Nowland, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/567,789

(22) Filed: Dec. 11, 2014

(65) Prior Publication Data

US 2016/0170785 A1     Jun. 16, 2016

(51) Int. Cl.
*G06F 9/455*     (2006.01)
*G06F 9/50*      (2006.01)

(52) U.S. Cl.
CPC ......... *G06F 9/45558* (2013.01); *G06F 9/5016* (2013.01); *G06F 9/5027* (2013.01); *G06F 2009/4557* (2013.01)

(58) Field of Classification Search
CPC .................................................. G06F 9/45558
USPC ...................................................... 718/1–108
See application file for complete search history.

(56) References Cited

U.S. PATENT DOCUMENTS

| | | | |
|---|---|---|---|
| 6,985,937 B1 * | 1/2006 | Keshav | G06F 9/5077 370/231 |
| 9,176,752 B1 | 11/2015 | Marr et al. | |
| 9,292,332 B1 | 3/2016 | Liguori et al. | |
| 2004/0225873 A1 | 11/2004 | Diaz | |
| 2005/0108712 A1 * | 5/2005 | Goyal | G06F 9/5083 718/100 |
| 2010/0333090 A1 * | 12/2010 | Wright | G06F 9/45516 718/1 |
| 2011/0066786 A1 | 3/2011 | Colbert | |
| 2012/0266169 A1 | 10/2012 | Lagergren et al. | |
| 2013/0152079 A1 * | 6/2013 | Heyman | G06F 9/45558 718/1 |
| 2014/0082614 A1 * | 3/2014 | Klein | G06F 9/45558 718/1 |
| 2015/0212844 A1 | 7/2015 | Tsirkin et al. | |

OTHER PUBLICATIONS

Raj, Himanshu, and Karsten Schwan. "High performance and scalable I/O virtualization via self-virtualized devices." Proceedings of the 16th international symposium on High performance distributed computing. ACM, 2007, pp. 179-188.*
Uhlig, Volkmar, et al. "Towards Scalable Multiprocessor Virtual Machines." Virtual Machine Research and Technology Symposium. 2004, pp. 43-56.*
Liu, Jiuxing, et al. "High Performance VMM-Bypass I/O in Virtual Machines." USENIX Annual Technical Conference, General Track. 2006, pp. 29-42.*

\* cited by examiner

*Primary Examiner* — Satish Rampuria
(74) *Attorney, Agent, or Firm* — Knobbe, Martens, Olson & Bear, LLP

(57) ABSTRACT

Generally described, the present application relates to systems and methods for the managing virtual machines instances using a physical computing device and an offload device. The offload device can be a separate computing device that includes computing resources (e.g., processor and memory) separate from the computing resources of the physical computing device. The offload device can be connected to the physical computing device via a interconnect interface. The interconnect interface can be a high speed, high throughput, low latency interface such as a Peripheral Component Interconnect Express (PCIe) interface. The offload device can be used to offload virtualization and processing of virtual components from the physical computing device, thereby increasing the computing resources available to the virtual machine instances.

20 Claims, 10 Drawing Sheets

MANAGING VIRTUAL MACHINE INSTANCES UTILIZING AN OFFLOAD DEVICE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources within the data centers, virtualization technologies may allow a single physical computing device to host one or more instances of virtual machines that appear and operate as independent computing devices to users of a data center. With virtualization, software applications running on the physical computing device can create, maintain, delete, or otherwise manage virtual machine instances in a dynamic manner.

Use of the data centers in increasing numbers has created increased demand for the computing resources. Even with virtualization technologies, the number of available resources that can be provided to the virtual machines is limited, at least in part, by the software applications managing the virtual machine instances in the physical computing devices. The cost associated with changing the existing hardware resources for better hardware components can be a considerable expense.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings.

DETAILED DESCRIPTION

Figure 1:
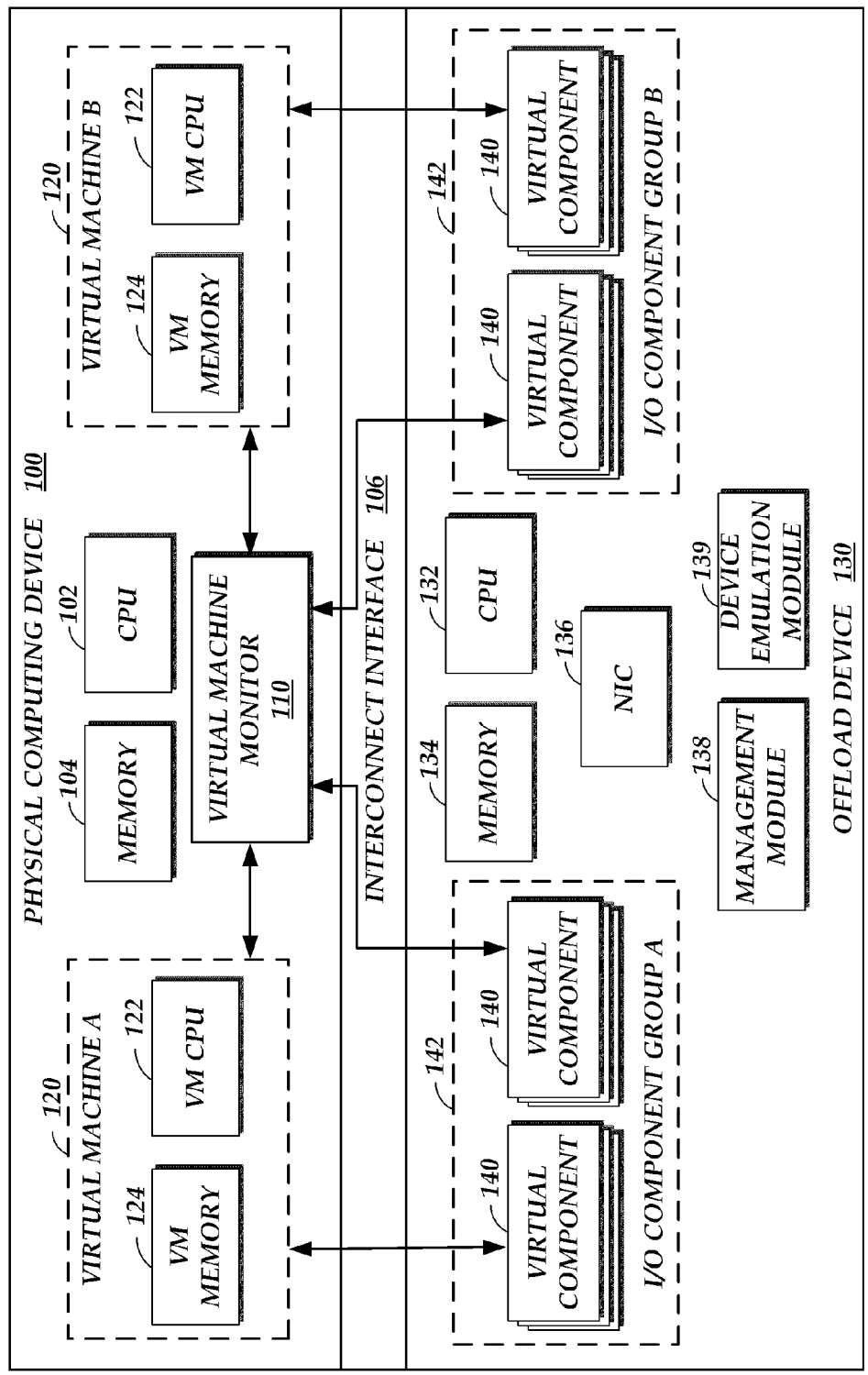
FIG. 1 is a block diagram depicting a physical computing device with an offload device and a plurality of virtual machine instances.

Generally described, a physical computing device can be configured to host a number of virtual machine instances. Specifically, such physical computing devices can execute a virtual machine monitor can be used to manage multiple aspects of virtual machine instances. Such a virtual machine monitor may often be referred to as a "hypervisor." The virtual machine monitor can associate and manage three primary virtualized resources to instantiated virtual machine instances, namely, virtual processing resources, virtual memory resources, and virtual input/output (I/O) resources, collectively or individually referred to as virtual components.

Although referred to as virtual components, the instantiation and operation of the virtual components requires computing resources of the physical computing device to implement. Generally, the virtual machine monitor will manage virtual components for each instantiated virtual machine instance on the physical computing device. As a result, physical computing resources are consumed to support the instantiated virtual components of each instantiated virtual machine instance and reduce the availability of the physical computing device resources for instantiated virtual machine instances or additional virtual machine instances.

The present application relates to systems and methods for the managing the instantiation and execution of virtual machines instances using a physical computing device and an offload device. In accordance with an illustrative embodiment, the offload device corresponds to an independent computing device that includes physical computing resources (e.g., processor and memory) separate from the physical computing resources associated with the physical computing device hosting the instantiated virtual machine instances. The offload device can be connected to the physical computing device via an interconnect interface. The interconnect interface can be a high speed, high throughput, low latency interface such as a Peripheral Component Interconnect Express (PCIe) interface. The offload device can be used to control the virtual machine monitor and emulate certain virtual components associated with the instantiated virtual machine instances, thereby decreasing the need to utilize physical computing resources in the execution of the instantiated virtual machine instances.

In accordance with an illustrative embodiment, the offload device can be used to instantiate virtual machines on the physical computing device. For example, the offload device can receive a command from a control plane manager via a network interface integrated into the offload device or a management domain and instruct the virtual machine monitor to launch virtual machines. In addition, the virtual machine monitor can provide resource information regarding the physical computing to the control plane manager via the offload device. The control plane manager can determine based on the resource information, such as the specific hardware configuration, and other information, such as the anticipated use of the physical computing device, the configuration of virtual machine instances on the physical computing device and virtual components on the offload device. The control plane manager can provide instructions to the virtual machine monitor to instantiate virtual machine instances in the determined configuration and instruct the offload device to instantiate virtual components in the determined configuration. The virtual machine monitor can provide mapping of the instantiated virtual components on the offload device such that the virtual machine instances can recognize and communicate with the virtual components through the interface bus.

In accordance with another illustrative embodiment, the virtual machine monitor can be configured to instantiate virtual machine instances on the physical computing device and instantiate respective virtual components on the offload device. The configuration of the virtual machine instances can determine the virtual components that are instantiated on the offload device on behalf of the instantiated virtual machine instances. The virtual machine monitor can also provide mapping of the instantiated virtual components on the offload device such that the virtual machine instances can recognize and communicate with the virtual components through the interface bus.

In accordance with an illustrative embodiment, the instantiated virtual I/O components on the offload device are configured to execute or process at least a portion of the I/O requests generated by the instantiated virtual machine instances. Illustratively, the virtual machine instances can communicate one or more I/O requests with the instantiated virtual I/O components on the offload device. In some aspects, the instantiated virtual machine instances may communicate directly with the virtual I/O components via the interface bus. In other aspects, the instantiated virtual machine instances can communicate indirectly with the virtual I/O components via the virtual machine monitor. In this aspect, the virtual machine monitor can use a translation table to route the I/O request to the virtual component. The type of communication can be based, at least in part, on communication protocols associated with the virtual I/O components or other criteria.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to illustrative components of host computing device, one or more aspects of the present disclosure can be applied with regard to different types or configurations of physical computing devices or combinations thereof.

FIG. 1 illustrates an embodiment of a physical computing device 100 configured to host virtual machine instances 120 and interact with an offload device 130. The physical computing device 100 includes one or more processing units 102, such as one or more CPUs. The physical computing device 100 includes memory 104, which may correspond to any combination of volatile or non-volatile computer-readable storage media. The memory 104 may store information which includes various programs, program data, and other modules. The programs stored in the memory can include a virtual machine monitor application 110 that can manage the virtual machine instances (e.g., by allocating memory to each virtual machine instance and scheduling virtual processors to run on physical processors). The physical computing device 100 can correspond to a wide variety of devices, such as servers, that include a wide variety of software and hardware components and configurations. The physical computing device 100 can include a local data store (not shown), or be configured to communicate with a data store over a network (not shown).

The physical computing device 100 is capable of hosting a plurality of virtual machine instances 120. The virtual machine monitor 110 can manage virtual machine instances 120 hosted on the physical computing device 100. Illustratively, the management of the virtual machine instances 120 can include the instantiation of the virtual machine instance and the instantiation of virtual components utilized in the execution of the virtual machine instance. Additionally, as will be explained in greater detail, the management of the virtual instances can further include the management of interaction between the virtual machine instances and the offload device 130 In the illustrated embodiment, the physical computing device 100 includes two instantiated, or hosted, virtual machine instances 120, virtual machine instance "A" and virtual machine instance "B". One skilled in the relevant art will appreciate, however, that the physical computing device 100 can host any number of virtual machine instances and is not limited to the hosting of the two virtual machine instances illustrated in FIG. 1.

With continued reference to FIG. 1, the offload device 130 can be operably coupled to the physical computing device 100 via the interconnect interface 106. The interconnect interface 106 can refer to a physical communication interface on the physical computing device 100. The interconnect interface 106 can be an electrical communication interface, an optical communication interface or other type of interconnect interface known in the art. The interconnect interface 106 can be configured to provide communications between components hosted on the offload device 130 with the virtual machine instances 120 hosted on the physical computing device 100. Illustratively, the configuration of the interconnect interface can be optimized based on specific criteria, such as low latency, high speed, and high bandwidth, among others. In some embodiments, the interconnect interface can correspond to a high speed serial computer expansion bus, such as a Peripheral Component Interconnect Express (PCIe) bus. However, one skilled in the relevant art will appreciate that the interconnect interface may incorporate alternative or additional standard interconnect interfaces well known to those skilled in the art of computer architectures.

In an example embodiment, the offload device 130 is a computing device, or partial computing device, operably coupled to the physical computing device 100. In some embodiments, the offload device 130 is physically coupled to the physical computing device 100 as well. The offload device 100 includes one or more processing units 132, such as one or more CPUs. The offload device 130 includes memory 134, which may correspond to any combination of volatile or non-volatile computer-readable storage media. The memory 134 may store information which includes various programs, program data, and modules, such as a management module 138 and a device emulation module 139. The management module 138 can management component can be configured to determine the type of virtual components to instantiate based on configuration information for the virtual machine instance. The device emulation module 139 can be configured to perform the emulation and instantiation of the virtual components on the offload device 130. The processor 132 and memory 134 of the offload device 130 are separate from the processor 102 and memory 104 of the physical computing device 100. The offload device 130 can include a local data store (not shown), and/or be configured to communicate with a data store over a network (not shown).

The offload device can include a network interface controller (NIC) 136. The offload device can be in communication with a control plane manager 150 (illustrated in FIG. 2A) via a network. The offload device can be configured act as an intermediary for providing instructions from the control plane manager 150 to the virtual machine monitor 110, which will be explained in greater detail below with respect to FIG. 2A.

As will be explained in greater detail below, the offload device 130 can host and emulate one or more virtual components that are used by the instantiated virtual machine instances substantially independent of one or more physical computing device 100 resources. The offload device 130 can be dynamically reconfigurable, such that the virtual components 140 can be removed, changed, added, or otherwise reconfigured to address the configuration of the virtual machine instances 120 on the physical computing device 100. Accordingly, the offload device 130 would use at least a portion of the physical computing resources on the offload device to carry out the function of the instantiated virtual components. By way of example, operations executed on the offload device 130 can be carried out using the computing resources (e.g., processor 132 and memory 134) without requiring the usage of the physical computing device's 100 computing resources (e.g., processor 102 and memory 104).

In accordance with an illustrative embodiment, at least some portion of the virtualized components hosted on the offload device 130 correspond to virtual I/O components configured to execute I/O functionality on behalf of instantiated virtual machine instances. As illustrated in FIG. 1, the offload device 130 can include virtual I/O component groups 142. Each virtual I/O component groups 142 corresponds to a virtual machine instance 120 on the physical computing device 100. In the illustrated embodiment the offload device 130 includes virtual I/O component group A is associated with virtual machine instance A and virtual I/O component group B associated with virtual machine instance B. Each virtual I/O component group includes a plurality of virtual components 140

Generally described, the virtual machine monitor 110 executed on the physical computing device 100 is configured to manage various aspects associated with instantiated virtual machines instances. In an embodiment, the management operations can be split between the virtual machine monitor and a management domain, such as a Domain-0, that runs on physical computing device 100. In yet another embodiment, all or portions of the programs that run within Domain-0 can instead run on the offload device 130. The virtual machine monitor 110 can be executed directly on the physical computing system hardware. The virtual machine monitor can function like a host operating system for the physical computing device 100. The virtual machine monitor 110 can control the hardware of the physical computing device 100 and manage and configure virtual machine instances 120 running on the physical computing device 100. The virtual machine monitor 110 can implement management functions that provide direct access to the hardware of the physical computing device 100.

To support hosted virtual machine instances, the virtual machine monitor 110 can instantiate guest domains on the physical computing device 100 for each virtual machine instances 120 by allocating the guest domains memory and time on the physical CPUs. As previously described, the allocated virtual resources include three primary virtualized resources that are utilized by the instantiated virtual machine instances, namely, virtual processing resources, virtual memory resources, and virtual I/O resources. In some embodiments, the configuration of the virtual machine instances 120 can be determined by a control plane manager 150 as described in greater detail in FIG. 2A. In some embodiments, the virtual machine monitor 110 can determine the -configuration of the virtual machine instances as described in greater detail in FIG. 2B.

Each virtual machine instance 120 is provisioned virtual resources that are implemented by the physical computing resources of the physical computing device 100. For example, a virtual machine instance can be allocated a virtual processing resources 122 and virtual memory resources 124 that represent logically provisioned allocations of underlying computing resources of the physical computing device (e.g., processor 102 and memory 104). Some of the virtual resources, such as virtual I/O resources, can be offloaded to the offload device 130. The configuration of the virtualized resources for each virtual machine instance 120 can vary. For example, virtual machine instance A and virtual machine instance B can have different allocations of virtualized computing resources.

The virtual machine instances 120 may be provisioned to provide a variety of different desired functionalities depending on the needs of a data center or client. Examples of the types of desired functionality can include, but are not limited to: database management, serving or distributing data or content (e.g., Web servers), managing load balancing or network resources, managing network connectivity or security, providing network addressing information, managing client or server redirection, or other functionalities. In some embodiments, the virtual machine instances 120 may be provisioned to implement portions of a hosted network or to simulate one or more components of a hosted network. Illustratively, the virtual machine instances 120 may be configured to provide specific functionality associated with the components of a hosted network or simulation of the components of the hosted network. The virtual machine instances 120 may be provisioned generically when a desired functionality is not specified or is otherwise not available.

As previously describe, aspects of the present application relate to the hosting of virtual I/O components on the offload device 130 in a manner that reduces the execution of I/O functionality by the hosted virtual resources on the physical computing device 100. Each virtual machine instance 120 is associated with virtual components 140 grouped into virtual I/O component groups 142. The virtual machine monitor 110 is responsible for the provisioning of virtual I/O component groups 142 for each of the virtual machine instances 120. The virtual components 140 can be logically grouped based on their association with a virtual machine instance 120. The virtual machine monitor 110 can assign memory address ranges to virtual components within the memory allocated to virtual machine instances. For example, in FIG. 1, virtual I/O component group A is associated with virtual machine A and the virtual I/O component group B is associated with virtual machine B. In some embodiments, the virtual components 140 can be provisioned and emulated using the computing resources (e.g., processor 132 and memory 134)

of the offload device 130. For example, the offload device 130 can run one or more programs that simulate the functions of hardware components that would be typically found on a motherboard of a computer system.

The virtual components 140 represent a set of virtual functions that can be implemented by a virtual machine instances 120. The virtual components 140 can provide virtual I/O functions that emulate the I/O functions of hardware computing devices found in a physical computing device. For example, the virtual components can correspond to I/O device types such as the real time clock (RTC), storage controller, network interface controller (NIC), programmable interrupt controller (PIC), peripheral component interconnect (PCI) bus, disk controller, SCSI controller, floppy drive, keyboard and mouse ports, monitor ports, serial ports, keyboard controller, ISA bus, and other I/O devices. The virtual components 140 are sometimes referred to as virtual devices. In a virtual computing environment not every function needs to be virtualized for every machine. The virtual machine monitor 110 can determine which I/O devices need to be virtualized based on the configuration of the virtual machine instance 120.

In addition to the functionality implemented by the virtual I/O components, the various virtual components 140 can be configured as to the specific communication protocols utilized by the instantiated virtual machines to access the I/O functionality. More specifically, in one embodiment, some of the virtual I/O components may correspond to a Port I/O communication protocol ("Port I/O virtual components") and other virtual I/O components may correspond to a memory-managed I/O (MMIO) communication protocol ("MMIO virtual components").

Port I/O virtual components can require specific communication protocols for communications between a virtual machine instance 120 and a Port I/O virtual component. In this embodiment, the virtual machine monitor 110 can function as an intermediary to handle the communication protocols required for the communication between the Port I/O virtual components and the virtual machine instance 120. The virtual machine monitor 110 can include a translation table that is used for handling communication between the virtual machine instance and port I/O virtual components 140, some MMIO components also use a translation table. The translation table can include a table for translating requests to and from the virtual machine instance 120 in order to route the requests to the correct addresses assigned to the virtual components 140. Additional details regarding the communication between virtual machine instances 120 and virtual components 140 that utilize the virtual machine monitor 110 are described below in associated with FIG. 3A.

The MMIO components can be configured such that the virtual machine instance 120 can communicate directly with the virtual component 140 by communicating with the memory addresses assigned to the virtual component 140. Additional details regarding direct communication between virtual machine instances 120 and virtual components 140 described below in associated with FIG. 3B.

The physical computing device 100 can be part of a network that includes multiple physical computing devices 100. One skilled in the relevant art will appreciate that the network is logical in nature and can encompass physical computing devices 100 from various geographic regions. Additionally, the network can include one or more physical computing devices 100 that do not host virtual machine instances 120.

Figure 2A:
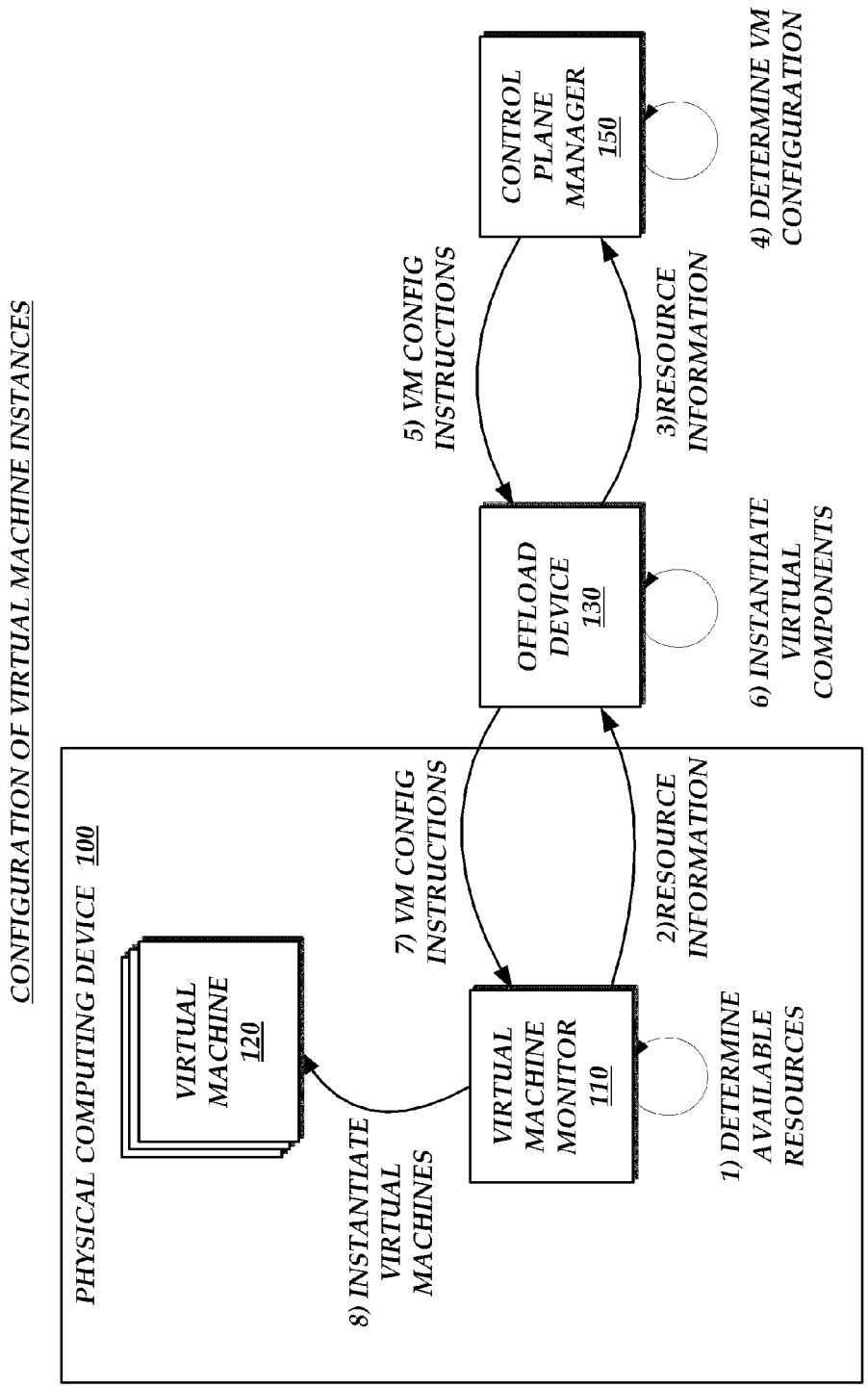
FIG. 2A illustrates an embodiment of a state flow diagram depicting the configuration of virtual machine instances on the physical computing device and virtual components on an offload device utilizing a control plane manager.

The physical computing devices can be managed by a centralized management system, such as illustrated by the control plane manager 150 in FIG. 2A. The control plane manager 150 can be configured to manage the operation and configuration of the physical computing devices 100 on the virtual network as well as select computer systems to host virtual machines and send launch instructions to the offload device 130 or a manager program that runs in Domain-0. The control plane manager 150 can determine configurations, operating parameters, resource allocations within virtual machine instances, for each physical computing device within a virtual network. In some embodiments, the managements system can comprise a plurality of control plane managers that control different allocations of physical computing devices. The control plane manager 150 can be in communication with the physical computing devices 100 through the offload device 130. In some embodiments, the control plane managers can communicate directly with the offload device 130 and/or the physical computing devices 100.

FIG. 2A illustrates a block diagram depicting the configuration of virtual machine instances 120 on the physical computing device 100 and virtual components 140 on the offload device 130 by a control plane manager 150. The control manager 150 can be in communication with the physical computing device 100 via the offload device 130. The functions described in association with FIG. 2A can be performed in a different sequence, can be added, merged, or left out altogether (e.g., not all described acts or events are necessary for the practice of the algorithms). Moreover, in certain embodiments, functions, acts or events can be performed concurrently. For example, the operations associated with (6), (7) and (8) can occur in a different order or can occur concurrently.

At (1), the virtual machine monitor 110 can determine the available resources of the physical computing device. The available resources can include information such as the available computing resources, such as processor type, memory configuration, hardware component configuration, versioning information, and other information that identifies the resources of the physical computing device. The resource information can include current operating conditions, computer resource utilization information associated with the current configuration of the physical computing device 100. In some embodiments, the resource information can include resource information associated with the offload device 130. The resource information can be gathered based on a request provided by the offload device or the control plane manager. In some embodiments, the virtual machine monitor may be configured to provide the resource information based on a triggering condition, such as during a portion of the boot process. In some embodiments, the virtual machine monitor 110 can be configured to periodically transmit the resource information.

In some embodiments, the resource information associated with a physical computing device 100 can be stored in a data store configured for maintaining the resource information associated with each physical computing device. The data store can also store the current operational state of the physical computing device, such as the instances that are running on the physical computing device 100.

At (2) the virtual machine monitor sends the resource information to the offload device. After receipt of the resource information, at (3) the offload device can send the resource information to the control plane manager. In some embodiments, the resource information provided by the virtual machine monitor 110 can be supplemented with resource information associated with the offload device 130. In such instances, the resource information may be sent together with the virtual machine monitor resource information or sent separately. In some embodiments, the offload device 130 can periodically send information to the control plane manager 150 to provide an update regarding the status of instances that are operating on the physical computing device 100.

At (4), the control plane manager can determine the configuration of the physical computing device 100 and the offload device 130. The determination can be based, in part, on the received resource information and information independent of the resource information. For example, the control plane manager 150 can also base the configuration on other considerations, such as client specifications, the configurations of other physical computing devices 100, such as clustered computing devices, or other considerations independent of the resource information associated with the physical computing device. In some instances the control plane manager can be configuring a new physical computing device 100, updating an existing configuration a physical computing device 100, adding/removing virtual instances, and/or performing other management function associated with the physical computing device 100.

The control plane manager 150 can determine the configuration of the allocation of the virtual machine instances on the physical computing devices and virtual components on the offload devices. As part of the configuration of the physical computing device 100, the control plane manager 150 can determine the virtualized hardware resources allocated to each virtual machine instance 120. A virtual machine instance 120 can have a specific configuration according to the computing capacity of the virtual machine instance. This can be based on the resource information, requirements of a customer, the system, number of instances operating on a physical computing device 100, and other considerations.

Based on the specific configuration of the virtual machine instances 120, the control plane manager 150 can determine the virtual components 140 that are associated with a virtual machine instance. The virtual machine instances 120 may have different specifications associated with the software and/or hardware of the virtual machine instance 120. The different specifications for the virtual machine instance 120 may require specific virtual components 140, which may differ from the virtual components configured for other virtual machine instances 120.

In some instances, the control plane manager 150 can receive a request to launch a new instance. Based on the request, the control plane manager 150 can filter out physical computing devices 100 that cannot host the instance, such as physical computing devices that are full, physical computing devices that do not have the necessary hardware, physical computing devices that are already hosting too many instances, or physical computing devices that do not meet the requirements for the new instance based on other reasons. The control plane manager can select a physical computing device from the remaining physical computing devices and sends a launch command to the offload device 130 or physical computing device with configuration instructions for launching the requested instance having a specific configuration.

At (5), configuration instructions are sent to the offload device 130 for configuration of the virtual components on the offload device 130. In some embodiments, the configuration instructions for the virtual machine monitor are included with the offload device configuration instructions.

In addition, in some embodiments the configuration instructions can be sent to the offload device 130 or a manager running in Domain0 as part of an instance launch command. In this example, the control plan manager 150 may have selected the physical computing device 100 to host a virtual machine and sent a command to launch an instance to the physical computing device 100.

At (6) the offload device can instantiate one or more virtual components 140 on the offload device 130 based on the configuration instructions received from the control plane manager. The virtual components 140 on the offload device 130 represent virtual IO functions that are provisioned for use by a virtual machine instance 120. Some non-limiting examples of virtual components 140 that may be instantiated on an offload device 130 include, a network interface controller (NIC), a programmable interrupt controller (PIC), a keyboard controller, an ISA bus, a floppy drive, a keyboard port, a mouse port, a monitor port, and a serial port. Some of the virtual components 140 instantiated for the virtual machine instance 120 can be based on the configuration of the virtual machine instance 120. Some of the virtual components 140 may be required for operation of the virtual machine instance 120, regardless of whether the virtual component 140 will be used. Some of the virtual components 140 may be virtualizations of hardware components that exist on the offload device, whereas others may be emulations of hardware components that do not exist on the offload device.

At (7), configuration instructions are sent to the physical computing device from the offload device 130 for configuration of the virtual machine instances on the physical computing device 100. In some embodiments, the configuration instructions for the virtual machine monitor 110 are sent directly from the control plane manager 150.

At (8), the virtual machine monitor 110 can instantiate the virtual machine instances 120 based on the configuration instructions provided by the control plane manager 150 via the offload device 130. In some embodiments, the control plane manager 150 can communicate directly with the virtual machine monitor 110. The virtual machine monitor 110 provisions the logical virtualized resources that are associated with the underlying physical resources to each virtual machine instance, such as a VM processor 102 and VM memory 104 based on the configuration instructions. The virtual machine monitor 110 can also provision storage resources that are included locally on the physical computing device 100 or that are accessible via network.

In some embodiments, the virtual I/O components can be instantiated on the physical computing device 100 and the offload device 130. In such embodiments, a portion of the virtual I/O components are instantiated on the physical computing device 100 and a portion of the virtual I/O components are instantiated on the offload device 130. The division of the virtual I/O components between the physical computing device 100 and the offload device 130 can be determined by the configuration instructions.

In some embodiments, the virtual machine monitor can include a memory mapping unit that manages the mapping of virtual components 140 instantiated on the offload device 130 to the virtual machine instance 120. The virtual machine monitor 110 can assign the virtual components 140 to memory addresses of the offload device. The addresses mapped to each virtual component 140 are provided to the virtual machine instance 120 associated with virtual component 140. The virtual components 140 associated with same virtual machine instance 120 may not be sequentially arranged within the memory of the offload device. In some embodiments, the virtual machine monitor 110 can assign ranges of memory addresses on the offload device to each virtual machine instance 120. For example, if there were 12 virtual machine instances 120 the virtual machine monitor 110 could assign separate ranges of memory addresses of the offload device 130 to each of the 12 virtual machine instances 120.

In other embodiments, the hosted virtual components 140 can be configured to communicate directly with a virtual machine instance 120. These virtual components 140 can be MMIO virtual components 140. In this instance the offload devices exposes or otherwise provides access to the virtual components 140 directly to the virtual machine instance 120. Some virtual components 140 can be configured to communicate indirectly with the virtual machine instance 120. For indirect communication, the virtual machine instance 120 communicates with the virtual component via the virtual machine monitor 110. The virtual machine monitor can create a translation table that is used to direct the IO communications between the virtual machine instance 120 and the offload device 130. Different translation tables can be created for port I/O virtual components and MMIO virtual components. The processes for direct and indirect communication between the virtual machine instances 120 and the virtual components 140 are described in more detail with respect to FIGS. 3A and 3B.

Figure 2B:
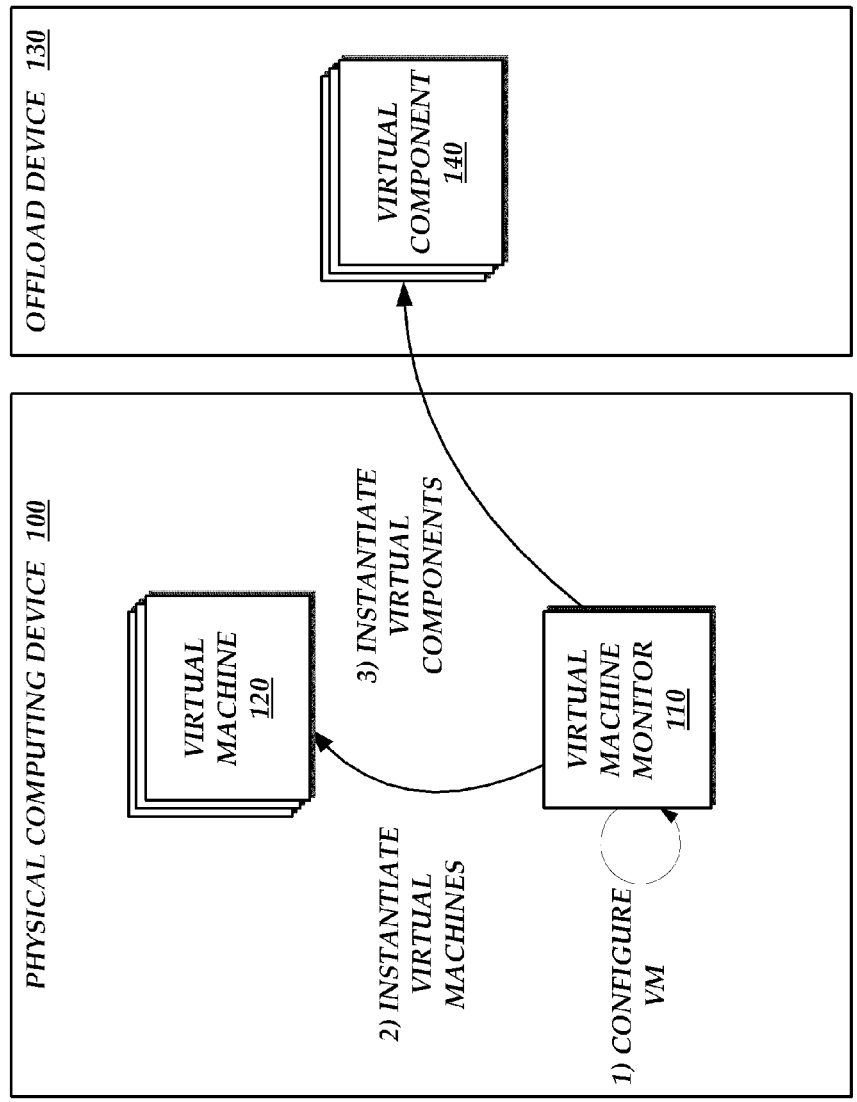
FIG. 2B illustrates an embodiment of a state flow diagram depicting the configuration of virtual machine instances on the physical computing device and virtual components on an offload device by a virtual machine monitor.

FIG. 2B illustrates a block diagram depicting the configuration of virtual machine instances 120 on the physical computing device 100 and virtual components 140 on the offload device 130 by the virtual machine monitor 110. The functions described in association with FIG. 2A can be performed in a different sequence, can be added, merged, or left out altogether (e.g., not all described acts or events are necessary for the practice of the algorithms). Moreover, in certain embodiments, functions, acts or events can be performed concurrently.

At (1), the virtual machine monitor 110 can configure the physical computing device 100 and the offload device 130. The virtual machine monitor 110 runs on the hardware of the physical computing device 100 and can communicate with the offload device 130. The virtual machine monitor 110 can configure guest domains for each of the virtual machine instances 120 on the physical computing device 100 and configure access to virtual components 140 on the offload device 130.

The virtual machine monitor can configure any number of virtual machine instances 120. The virtual machine instances 120 can be configured automatically based on defined criteria, instructions from other systems, or other types of instructions. The virtual machine monitor can also provide a management interface that can allow an administrator or other user to manually configure the virtual machine instances 120 on the physical computing device 100.

With continued reference to FIG. 2B, as part of the configuration of the physical computing device 100, the virtual machine monitor 110 can determine the virtualized hardware resources allocated to each virtual machine instance 120. A virtual machine instance 120 can have a specific configuration according to the computing capacity of the virtual machine instance. This can be based on the requirements of a customer, the system, number of instances operating on a physical computing device 100, and other considerations. The configuration information can include configuring a translation table that is used for memory mapping to the I/O devices.

Based on the specific configuration of the virtual machine instances 120, the virtual machine monitor 110 can determine the virtual components 140 that are associated with a virtual machine instance. The virtual machine instances 120 may have different specifications associated with the software and/or hardware of the virtual machine instance 120. The different specifications for the virtual machine instance 120 may require specific virtual components 140, which may differ from the virtual components configured for other virtual machine instances 120.

After the configuration of a virtual machine instance 120 is determined, at (2), the virtual machine monitor 110 can instantiate the virtual machine instances 120. The virtual machine instances 120 provide a domain for operating systems and applications to run. The virtual machine instances can be fully isolated from other virtual machine instances 120. The virtual machine monitor 110 provisions the logical virtualized resources that are associated with the underlying physical resources to each virtual machine instance, such as a VM processor 102 and VM memory 104. The virtual machine monitor 110 can also provision storage resources that are included locally on the physical computing device 100, on the offload device 130, or that are accessible via network. In combination with the provisioning of the virtual machine instances 120, the virtual machine monitor is also responsible for provisioning the IO virtual components 140 that are required by the virtual machine instance.

In some embodiments, the virtual I/O components can be instantiated on the physical computing device 100 and the offload device 130. In such embodiments, the virtual machine monitor 110 instantiates a portion of the virtual I/O components on the physical computing device 100 and a portion of the virtual I/O components on the offload device 130. The division of the virtual I/O components between the physical computing device 100 and the offload device 130 can be determined by the configuration data associated with the virtual machine instance 120.

At (3) the virtual machine monitor 110 or a Domain-0 can cause the offload device 130 to instantiate one or more virtual components 140 by sending information that identifies the type and umber of virtual components to instantiate. The virtual components 140 on the offload device 130 emulate functions performed by I/O physical components. Some non-limiting examples of virtual components 140 that may be instantiated on an offload device 130 include, a storage device, a network interface controller (NIC), a programmable interrupt controller (PIC), a keyboard controller, an ISA bus, a floppy drive, a keyboard port, a mouse port, a monitor port, and a serial port. Some of the virtual components 140 instantiated for the virtual machine instance 120 can be based on the configuration of the virtual machine instance 120. Some of the virtual components 140 may be required for operation of the virtual machine instance 120, regardless of whether the virtual component 140 will be used. Some of the virtual components 140 may be virtualizations of hardware components that exist on the offload device, whereas others may be virtualizations of hardware components that do not exist on the offload device.

In some embodiments, the virtual machine monitor can include a memory mapping unit that manages the mapping of virtual components 140 instantiated on the offload device 130 to the virtual machine instance 120. The virtual machine monitor 110 can assign the virtual components 140 to memory addresses of the offload device. The addresses mapped to each virtual component 140 are provided to the virtual machine instance 120 associated with virtual component 140. The virtual components 140 associated with same virtual machine instance 120 may not be sequentially arranged within the memory of the offload device. In some embodiments, the virtual machine monitor 110 can assign ranges of memory addresses on the offload device to each virtual machine instance 120. For example, if there were 12 virtual machine instances 120 the virtual machine monitor 110 could assign separate ranges of memory addresses of the offload device 130 to each of the 12 virtual machine instances 120.

In other embodiments, the hosted virtual components 140 can be configured to communicate directly with a virtual machine instance 120. These virtual components 140 can be MMIO virtual components 140. In this instance the offload devices exposes or otherwise provides access to the virtual components 140 directly to the virtual machine instance 120. Some virtual components 140 can be configured to communicate indirectly with the virtual machine instance 120. For indirect communication, the virtual machine instance 120 communicates with the virtual component via the virtual machine monitor 110. The virtual machine monitor can create a translation table that is used to direct the IO communications between the virtual machine instance 120 and the offload device 130. Different translation tables can be created for port I/O virtual components and MMIO virtual components. The processes for direct and indirect communication between the virtual machine instances 120 and the virtual components 140 are described in more detail with respect to FIGS. 3A and 3B.

Figure 3A:
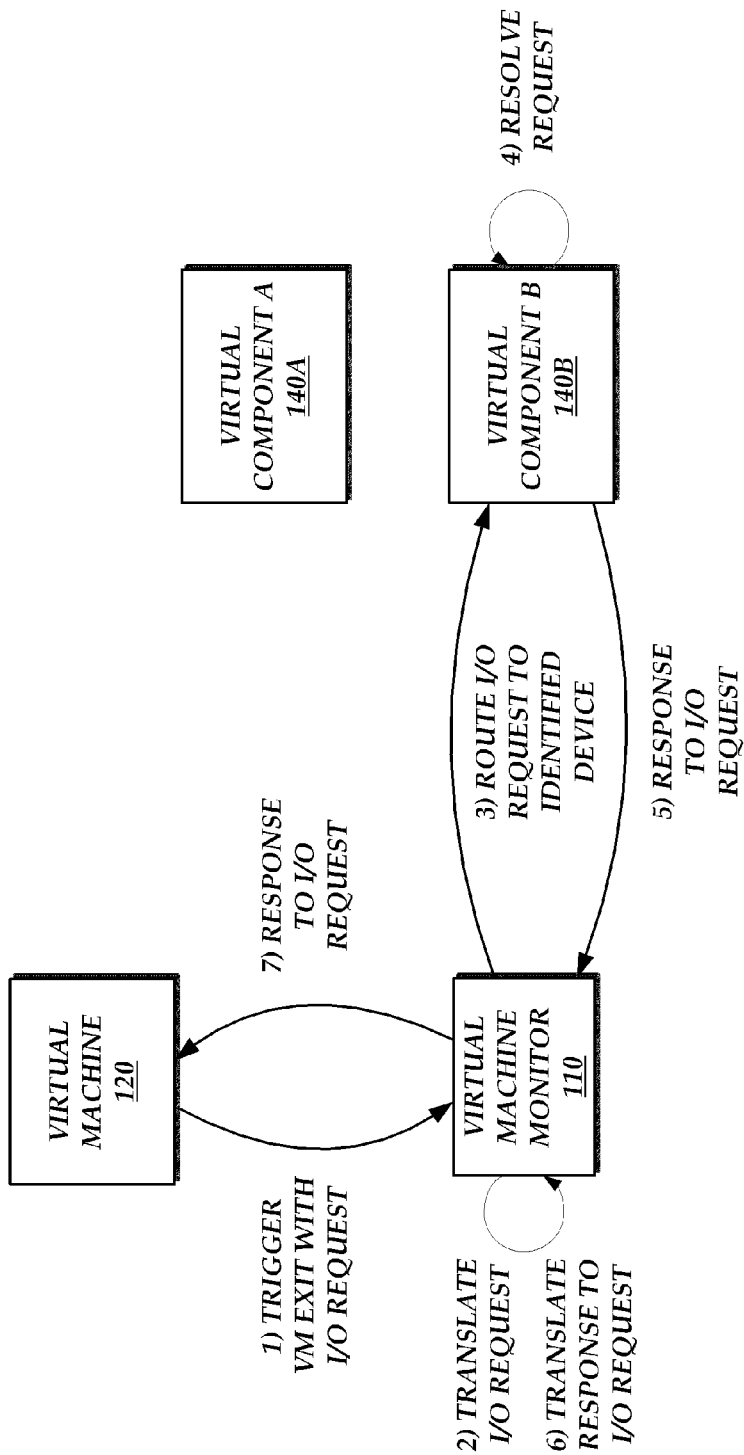
FIG. 3A illustrates an embodiment of a state flow diagram depicting indirect communication between a virtual machine instance and a virtual component via the virtual machine monitor.

FIG. 3A illustrates the components of the virtual network depicting communication between a virtual machine instance 120 and a virtual component 140 that uses the virtual machine monitor 110 as an intermediary between the virtual machine instance 120 and the virtual component. The diagram illustrates indirect communication between the virtual machine instance 120 and virtual component 140. Indirect communication can occur when a virtual component 140 virtualizes a Port I/O device and some MMIO devices. The devices can require communication protocols that do not allow the virtual machine instance 120 to directly access the assigned memory addresses of the virtual components 140.

At (1) an I/O request from the virtual machine instance 120 triggers a virtual machine exit, also referred to as a VM exit. A VM exit is in response to certain I/O requests and/or events that marks the point at which a transition is made between the virtual machine instance 120 currently running and the virtual machine monitor 110, which must exercise system control to process the request. Virtual components 140 that use indirect communication, and thus trigger VM exits, are determined during initialization and instantiation of the virtual machine instance 120 and virtual components 140. The I/O requests that can trigger the VM exit are Port I/O requests and some identified MMIO requests. The I/O request identifies a specific virtual function of a virtual component 140 and includes instructions for the identified virtual component 140. When the VM exit is triggered by the I/O request, the virtual machine instance 120 sends the I/O request to the virtual machine monitor 110.

At (2) the I/O request is received and translated by the virtual machine monitor 110. The virtual machine monitor 110 receives the request and uses a translation table for translating the I/O request. The translation table can include entries for each virtual component 140 that requires a VM exit. The virtual machine monitor can include separate translation tables for different types of virtual components 140. For example, Port I/O virtual components and MMIO virtual components can have different translation tables. In some embodiments, the translation table can combine the translation information for Port IO virtual components 140 and MMIO virtual components 140 into a single table. The configuration of the translation table can be preconfigured by the virtual machine monitor. The translation table can store the routing information used for routing the received I/O request to the identified virtual component 140. After the I/O request is received, the virtual machine monitor can look up the I/O request in the translation table and route the request to the memory address of the offload device 130 that is responsive to the I/O request.

At (3), the I/O request is routed to the identified virtual component 140B. The I/O request is sent from the physical computing device 100 over the interface to the offload device 130. At (4) the I/O request is received and resolved by the virtual component 140B. The virtual component 140B can resolve the request based on the information contained in the I/O request. The virtual component 140 can resolve the request based on the virtual function that is assigned to the memory address identified in the I/O request. The processing of the request is performed by the computing resources of the offload device and does not utilize the computing resources assigned to the virtual machine instance 120. The I/O request can be a simple read or write, or a complex algorithm that is implemented on the offload device. For example, the offload device 130 may execute one or more device emulator programs. The offload device 130 may process the request and identify the appropriate emulator based on characteristics of the request. Next, the device emulator can run and process the request. For virtual components 140 set up on the offload device, the type of request is not considered when determining whether route the request using the offload device. Rather, the virtual machine monitor 110 routes the request regardless of the operations that are to be performed based on the request.

Based on the type of the request, the resolution of the request performed by the virtual component 140 can differ. In some instances, the I/O request may require a response from the virtual component 140B. In some instances, the I/O request is resolved and may send an acknowledgment back to the virtual machine instance. For example, a write command from the virtual machine instance 120 to the virtual device may require a response from the virtual component 140 to the virtual machine instance 120. In which case, an acknowledgment can be sent from the virtual component 140 to the virtual machine instance 120.

In some instances, the process continues when an I/O request requires a response from the virtual component 140 to the virtual machine instance, such as a read request. In which case, after the request is resolved the virtual component 140 responds to the request. At (5), the virtual component 140 sends a response to the I/O request. The response can include the information specific to the request and is dependent on the specific parameters of the I/O request and the virtual component, or may be an acknowledgement.

At (6), the virtual machine monitor 110 translates that response to the I/O request. The translation of the response is performed using the translation table to route the response to the virtual machine instance 120 that initiated the request. At (7), the response to the I/O request is sent to the identified virtual machine instance 120 from the virtual machine monitor based on the information stored in the translation table of virtual machine monitor. The response can be accompanied by a VM resume that closes out the VM exit. At this point, the process completes and can be reinitiated each time an IO request is required that uses the translation table of the virtual machine monitor to act as an intermediary between the virtual machine instance 120 and the virtual component.

Figure 3B:
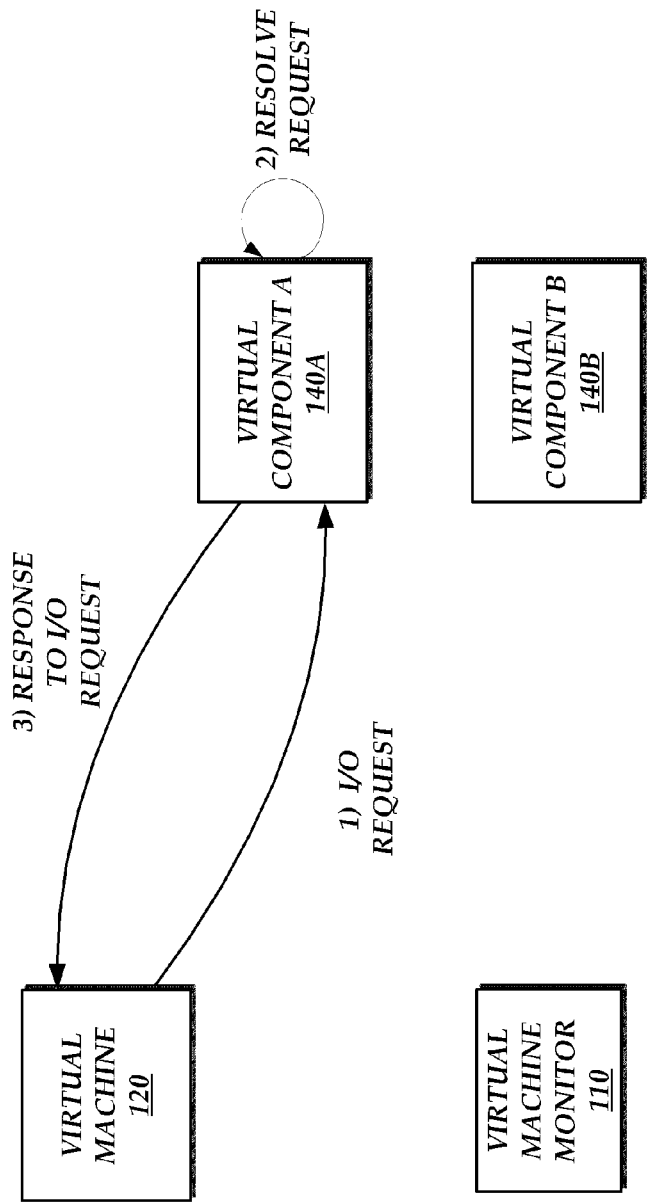
FIG. 3B illustrates an embodiment of a state flow diagram depicting direct communication between a virtual machine instance and a virtual component.

FIG. 3B illustrates a block diagram depicting direct communication between a virtual machine instance 120 and a virtual component. Virtual machine instances 120 can communicate directly with the MMIO virtual components. The MMIO virtual components 140 allow for direct communication between the virtual machine instance 120 and the memory registers assigned to the virtual component 140 without any interaction between the virtual machine instance 120 and the virtual machine monitor 110.

At (1) the virtual machine transmits an I/O request to a virtual component. The virtual machine instance 120 transfers the request to the virtual component 140 using memory addressing assigned to the virtual component 140 during instantiation of the virtual machine instance 120 and the virtual component. The virtual component 140 can be assigned to a range of memory addresses for communication with the virtual machine instance. Depending on the type of request the virtual machine instance 120 can communicate with a specific memory register. The memory mapping of the virtual component 140 allows the virtual machine instance 120 to communicate directly with the virtual component 140 through the interconnect interface 106. A memory management unit can translate device-visible virtual memory addresses to physical memory addresses on the offload device 130.

At (2), the I/O request is resolved by the device. The I/O request can be any type of request such as a read or write request. The virtual component 140 can resolve the request based on the specific parameters of the request. The processing of the request is performed by the computing resources of the offload device and does not utilize the computing resources assigned to the virtual machine instance 120. The I/O request can be a simple read or write, or a complex algorithm that is implemented on the offload device. For virtual components 140 set up on the offload device, the type of request is not considered when determining whether route the request using the offload device. Rather, the virtual machine monitor 110 routes the request regardless of the operations that are to be performed based on the request.

At (3), the virtual component 140 can generate a response and send it to the virtual machine instance. For example, an acknowledgment can be sent from the virtual component 140 to the virtual machine instance 120.

Figure 4:
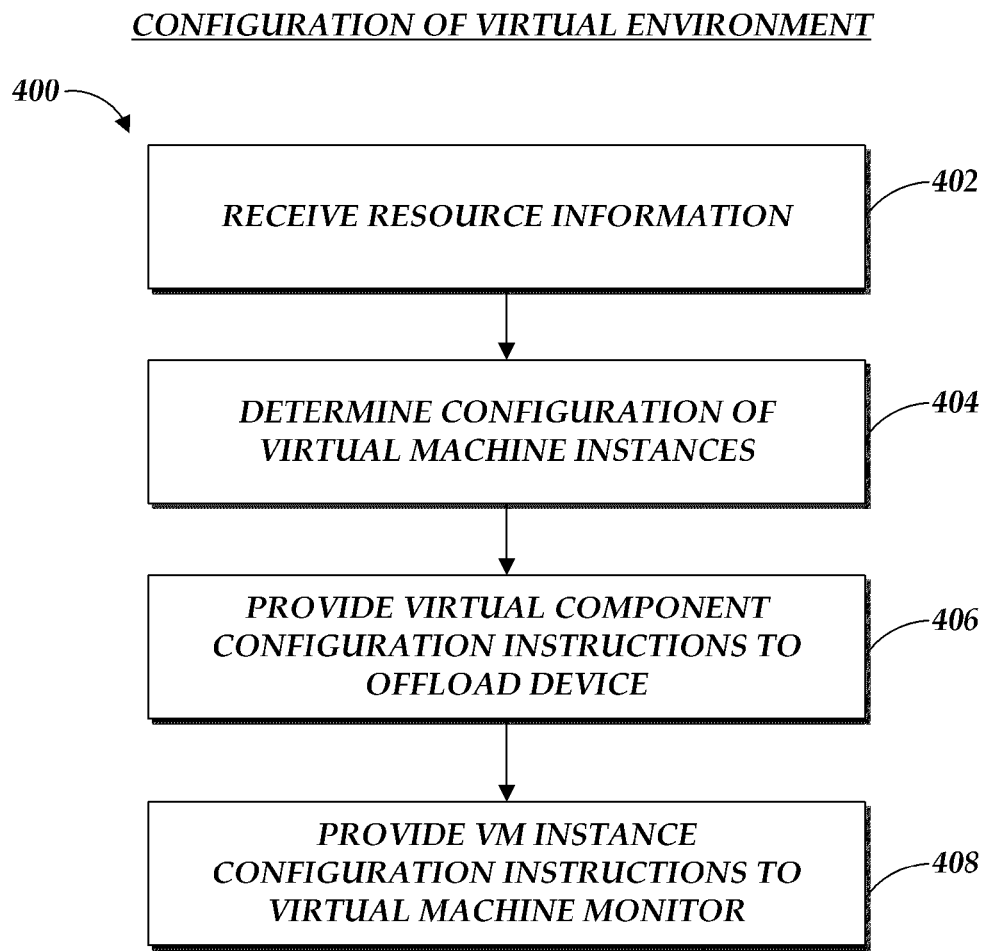
FIG. 4 illustrates a flow diagram of a routine for determining a configuration of a virtual environment on a physical computing device and an offload device by a control plane manager.

FIG. 4 illustrates a flow diagram of a routine 400 depicting the configuration of a virtual environment on a physical computing device 100 and an offload device 130. The steps of the routine 400 are being described as generally being performed by a control plane manager 150. The functions described in association with FIG. 4 can be performed in a different sequence, can be added, merged, or left out altogether (e.g., not all described acts or events are necessary for the practice of the algorithms). Moreover, in certain embodiments, functions, acts or events can be performed concurrently.

At block 402, the control plane manager 150 receives resource information associated with the physical computing device and the offload device. The resource information can include information such as the available computing resources, such as processor type, memory configuration, hardware component configuration, versioning information, and other information that identifies the resources of the physical computing device and the offload device. The resource information can include current operating conditions, computer resource utilization information associated with the current configuration of the physical computing device 100 and the offload device. The resource information can be gathered based on a request provided by the offload device 130 or the control plane manager 150.

As part of a request to launch a virtual machine, and as illustrated at block 404, the control plane manager can determine a configuration for a virtual machine instance to launch on the physical computing device 100. The determination can be based, in part, on the resource information and information independent of the resource information. For example, the control plane manager 150 can also base the configuration on other considerations, such as client specifications, the configurations of other physical computing devices 100, such as clustered computing devices, or other considerations independent of the resource information associated with the physical computing device.

As part of determining the configuration of the virtual machine, the control plane manager 150 can determine the virtualized hardware resources that will need to be allocated to the virtual machine instance 120. A virtual machine instance 120 can have a specific configuration according to the computing capacity of the virtual machine instance. This can be based on the resource information, requirements of a customer, the system, the number of instances operating on the physical computing device 100, and other considerations. The virtual machine instances 120 may have different specifications associated with the software and/or hardware of the virtual machine instance 120. The different specifications for the virtual machine instance 120 may require specific virtual components 140, which may differ from the virtual components configured for other virtual machine instances 120.

At block 406, the configuration instructions are provided to the offload device 130 for configuration of the virtual components on the offload device 130. The offload device can instantiate one or more virtual components 140 on the offload device 130 based on the configuration instructions received from the control plane manager. Based on the specific configuration of the virtual machine instances 120, the offload device 130 and/or the virtual machine monitor can determine the virtual components 140 to instantiate on the offload device 130.

At block 408, configuration instructions are provided to the physical computing device from the offload device 130 for configuration of the virtual machine instances on the physical computing device 100. In some embodiments, the configuration instructions for the virtual machine monitor 110 are sent directly from the control plane manager 150 to the virtual machine monitor. The virtual machine monitor 110 can instantiate the virtual machine instances 120 based on the configuration instructions provided by the control plane manager via the offload device. In some embodiments, functions associated with blocks 406 and 408 can occur substantially simultaneously in response to a instance launch request.

Figure 5:
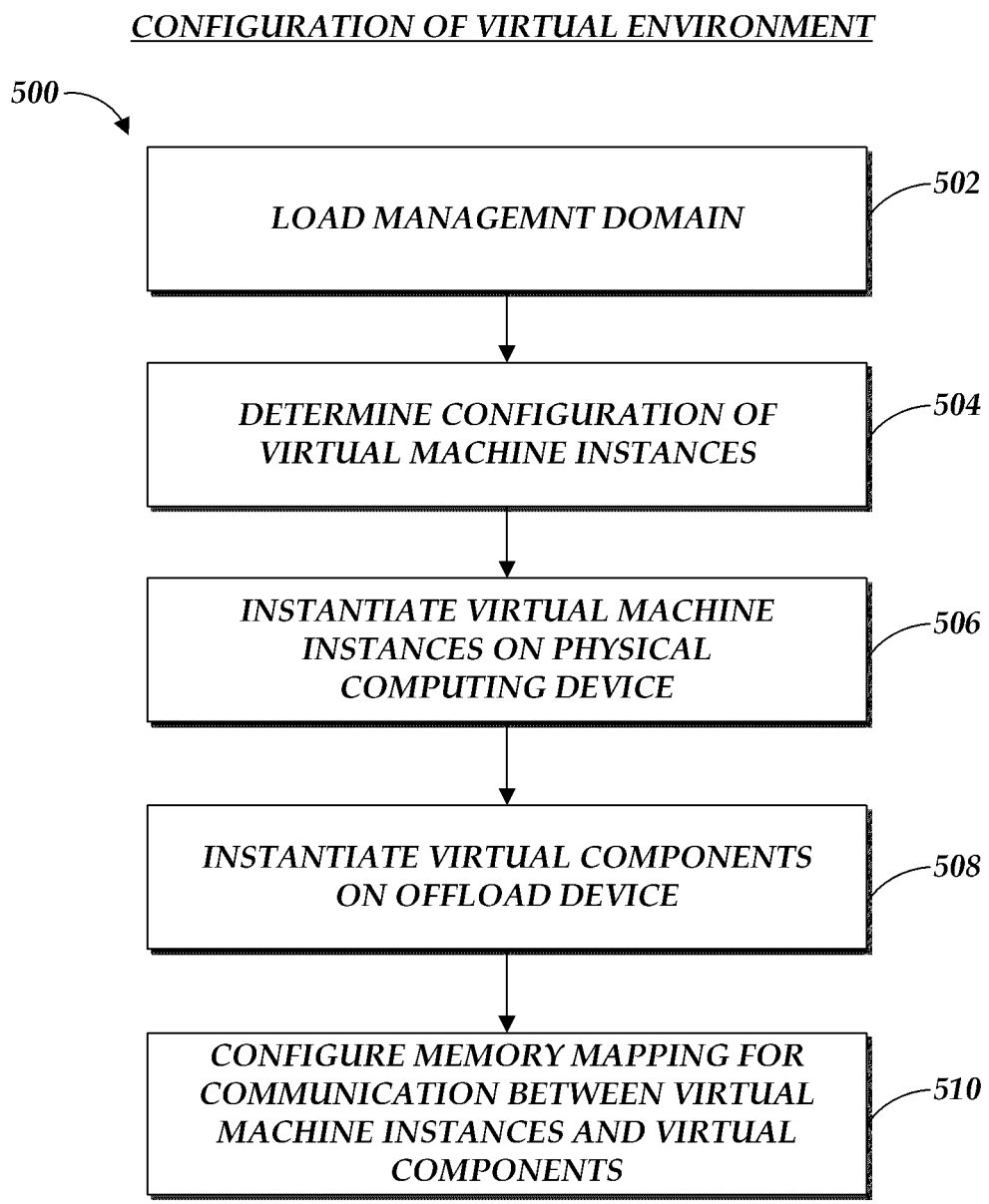
FIG. 5 illustrates a flow diagram of a routine for the configuration of a virtual environment on a physical computing device and an offload device.

FIG. 5 illustrates a flow diagram of a routine 500 depicting the configuration of a virtual environment on a physical computing device 100 and an offload device 130. The steps of the routine 500 are being described as generally being performed by a virtual machine monitor 110 on the physical computing device 100 and/or by management software on the offload device 130, such as the management module 138 and device emulation module 139.

At block 502 the virtual machine monitor 110 and management software running on offload device 130 boot on the physical computing device 100. The virtual machine monitor 110 can instantiate instances on the physical computing device 100. The virtual machine monitor 110 can control the provisioning of resources of the hardware resources from the machine to specific virtual machine instances 120 and those virtual machine instances 120 can then be logically associated with the underlying hardware resources.

After a request to launch an instance is received, and as illustrated at block 504, the virtual machine monitor 110 can determine the configuration of the virtual machine instances 120. The determination of the virtual machine instances 120 can be based on information provided from an administrator or control plane manager 150. The configuration can be a default configuration based on defined operating procedures stored within the virtual machine monitor 110 or it can be passed to the offload device 130 from the control plane manager 150. In some instances the virtual machine monitor may be manually controlled by a user in order to determine the configuration for the virtual machine instances 120. The determination of the configuration of the virtual machine instances 120 can include the number of virtual machine instances 120, the resources provisioned to each virtual machine instance, one or more machine image to use to generate each virtual machine instance, and other virtual machine instance 120 configuration information. The number of virtual machine instances 120 can be based on the computing resources of the physical computing device 100, the offload device 130, or other configuration parameter. The number of virtual machine instances 120 may not limited by any predefined limit. The provisioning of virtual computing resources assigned to each virtual machine instance 120 can be based on logical physical resources of the physical computing device 100. The specific configuration of the virtualized computing resources can vary for each virtual machine instance. The virtualized computing resources can include a virtual machine CPU, virtual machine memory and other resources used for the operation of the virtual machine instance. The machine image used to instantiate a virtual machine instance can include the operating system (e.g., Windows®, Linux®, etc.), applications, and any other software. The type of virtual components 140 required by the virtual machine instance 120 can be based on the specific configuration of the virtual machine instance. The virtual machine monitor 110 can determine the allocation of virtual components 140 between the physical computing device 100 and the offload device 130. The virtual machine instance 120 may be configured with some virtual components 140, such as data stores, and the offload device 130 may be configured with some virtual components 140. In some embodiments, the virtual components 140 may be allocated primarily to the offload device 130.

At block 506, the virtual machine monitor can instantiate the virtual machine instances 120 on the physical computing device 100. Each virtual machine instance 120 is configured within a guest domain on the physical computing device 100. Each guest domain is configured to be independent of the other guest domains. The instantiation of the virtual machine instance 120 includes the determined configuration of computing resources, software, and other components as determined at block 404. In an example embodiment, the virtual machine monitor can determine the allocation of the virtual components 140 between the physical computing device 100 and the offload device 130. For example, the virtual machine monitor may configure the physical computing device 100 to not have any virtual components 140 allocated to the physical computing device 100 and all of the virtual components 140 allocated to the offload device 130. Alternatively, the management module 138 on the offload device 130 can determine the allocation of virtual components 140 between the physical computing device 100 and the offload device 130.

At block 508, the virtual components 140 can be configured on the offload device 130. For example, either the virtual machine monitor, a domain-0 management program, or management programs on the offload device 130, such as the management module 138 and the device emulation module 139, can configure the virtual components 140. The number and type of virtual components 140 on the offload device 130 can be based on the specific configuration of the virtual machine instance. The virtual components 140 can include MMIO virtual components 140 and Port IO virtual components 140. The virtual components 140 on the offload device 130 can be logically partitioned according to their associated virtual machine instance 120. The virtual components 140 are associated with virtual functions. The virtual components 140 are instantiated in the memory of the offload device 130. In some instances the offload device 130 can have defined partitions that that include sequential ranges of memory assigned to a virtual machine instance. In some embodiments, the virtual components 140 on the offload device 130 are assigned to logical locations within the memory, which may not be sequential in nature. The instantiation of the virtual components 140 on the offload device 130 allows for the physical computing device 100 to not have to allocate memory to the instantiation of the virtual components 140. Some of the virtual components 140 may never be using in a virtual operating environment but are required for the operation of the virtual machine instance. The instantiation of the virtual components 140 can result in resource usage overhead that reduces the available computing resources that are provisioned to the virtual machine instances 120. By allocating the virtual components 140 on the offload device 130, computing resources on the physical computing device 100 can be freed up for usage by the virtual machine instances 120.

At block 510, the virtual machine monitor can determine the memory mapping of the virtual components 140 and the communication between the virtual components 140 and the virtual machine instance. A memory manager unit can determine the memory mapping for enabling communication between the virtual machine instances and the virtual components 140. Depending on the type of virtual component, the virtual machine monitor can allow for direct access to the virtual component 140 or can provide indirect access via the virtual machine monitor. For direct access the virtual machine monitor assigns addresses to the virtual components 140 that allow the virtual machine instance 120 to communicate directly with the virtual components. For indirect access, the virtual machine monitor 110 can configure a translation table for communication between the virtual machine instances 120 and the virtual components 140. The translation table can include addressing information for port I/O virtual components 140 and some MMIO virtual components 140.

The instantiation of the virtual components 140 on the offload device 130 can be done in parallel with the instantiation of the virtual machine instance 120 on the physical computing device 100. Some steps can be done in parallel while others may be done sequentially. The steps are merely illustrative of logical processes that are being performed by the virtual machine monitor on the physical computing device 100 and the offload device 130.

Figure 6:
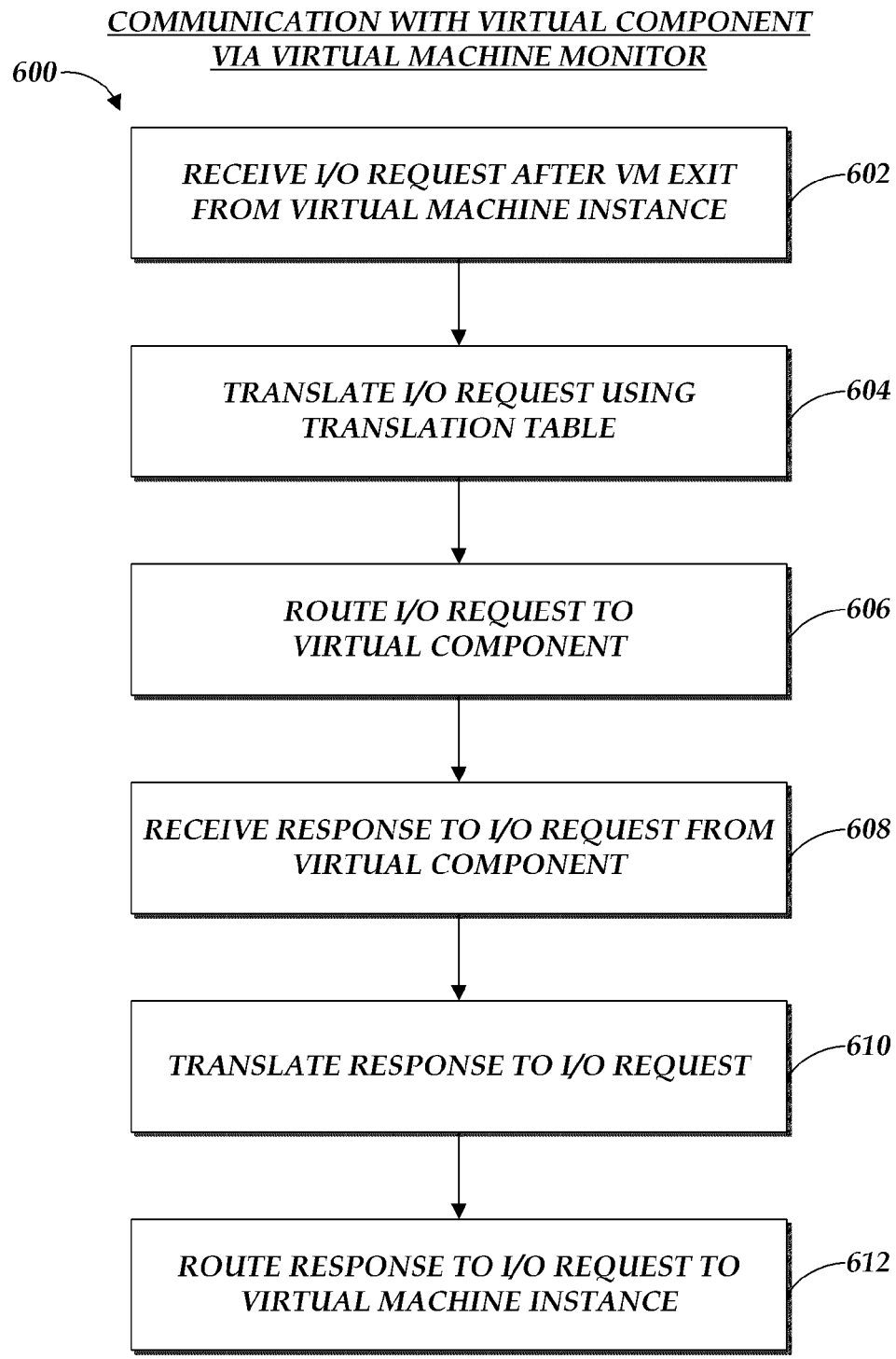
FIG. 6 illustrates a flow diagram of a routine for indirect communication between the host computing device and the virtual device via the virtual machine monitor.

FIG. 6 is a flow diagram illustrating a routine 600 depicting indirect communication between the host computing device and the virtual device via the virtual machine monitor 110. The steps of the routine 600 are being described as generally being performed by a virtual machine monitor 110 on the physical computing device 100.

At block 602 the virtual machine monitor receives an I/O request from a virtual machine instance 120, which is triggered by a VM exit. When the VM exit is triggered by the I/O request, the virtual machine instance 120 sends the I/O request to the virtual machine monitor. The I/O request comes from the virtual machine instance 120 for a specific virtual component.

At block 604, the I/O request is translated by the virtual machine monitor 110. The virtual machine monitor receives the request and has a translation table that is used for translating the I/O request. The translation table can include entries for each virtual component 140 that requires a VM exit. The virtual machine monitor can include separate translation tables for different types of I/O devices. For example, Port IO virtual components 140 and MMIO virtual components 140 can have different translation tables. In some embodiments, the translation table can combine the translation information for Port IO virtual components 140 and MMIO virtual components 140. The configuration of the translation table can be preconfigured by the virtual machine monitor. The translation table can be a lookup table that can store the routing information for the virtual components 140. When the I/O request is received, the virtual machine monitor can look up the I/O request in the translation table and determine the routing information for directing the I/O request to the correct location associated with the addressed virtual component on the offload device 130.

At block 606, the virtual machine monitor 110 routes the I/O request to the identified virtual component. The I/O request is sent from the physical computing device 100 over the interface bus to the offload device 130. The processing of the request is performed by the computing resources of the offload device and does not utilize the computing resources assigned to the virtual machine instance 120. The I/O request can be a simple read or write, or a complex algorithm that is implemented on the offload device. For virtual components 140 set up on the offload device, the type of request is not considered when determining whether route the request using the offload device. Rather, the virtual machine monitor 110 routes the request regardless of the operations that are to be performed based on the request.

At block 608, the virtual machine monitor receives a response to the I/O request from the virtual component. When a response is not required, the virtual machine monitor 110 can receive an acknowledgment from the virtual component 140. The response can include the information responsive to the request, which can be dependent on the specific parameters of the IO request and the virtual component.

At block 610, the virtual machine monitor 110 translates that response to the I/O request. The translation of the response is performed using the translation table to route the response to the virtual machine instance 120 that initiated the request.

At block 612, the response to the I/O request is sent to the identified virtual machine instance 120 from the virtual machine monitor based on the information stored in the translation table of virtual machine monitor. The response can be accompanied by a VM resume that closes out the VM exit. At this point the process completes and can be reinitiated each time an IO request is required that uses the translation table of the virtual machine monitor to act as an intermediary between the virtual machine instance 120 and the virtual component.

Figure 7:
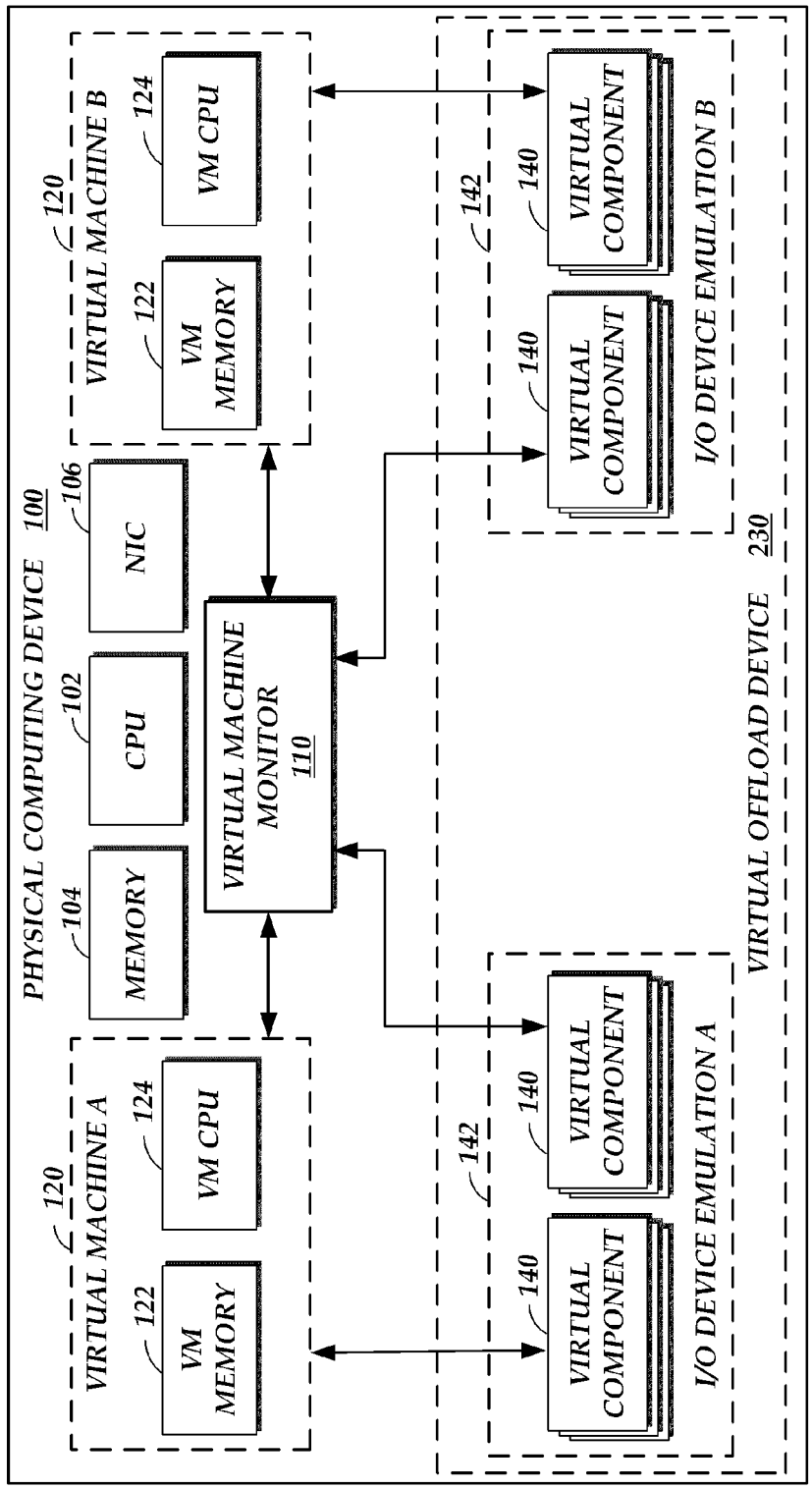
FIG. 7 is a block diagram depicting an embodiment of a physical computing device configured with a virtual offload device.

FIG. 7 illustrates another embodiment of a virtual operating environment for a physical computing device 100 with a virtual offload device 230. The physical computing device 100 does not have a physical offload device like the embodiment illustrated in FIG. 1. In this embodiment of the virtual offload device 230, the physical computing system hosts a plurality of virtual machine instances 120 and a virtual offload device 230. The virtual offload device 230 is partitioned to a specific portion of the physical computing device 100. The virtual offload device 230 is instantiated using the computing resources from the physical computing device 100 rather than from a separate offload device 130. The virtual offload device 130 provides the same functionality as described in association with FIGS. 1 through 5. In this manner the virtual components 140 are logically partitioned to a single logical grouping which can consolidate the organization and optimization of the virtual components 140.

Figure 8:
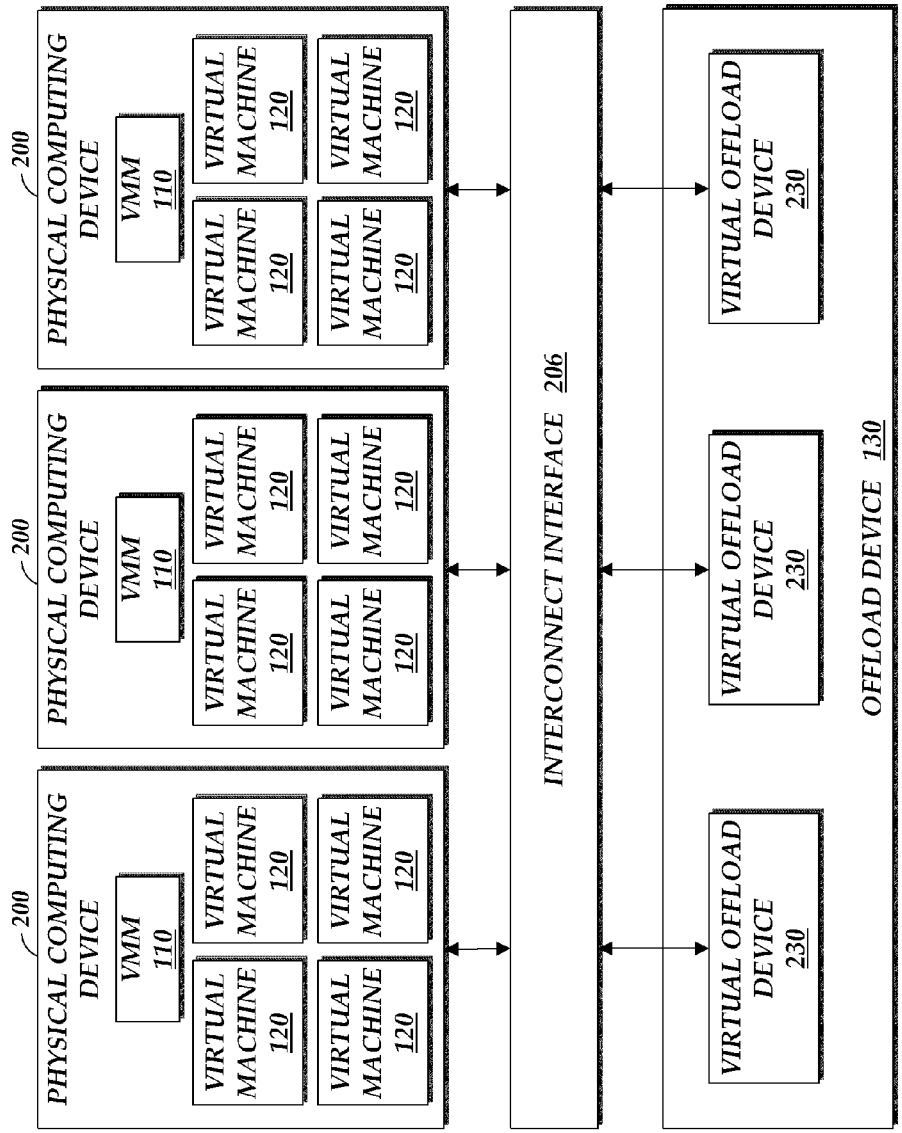
FIG. 8 is a block diagram depicting an embodiment of an environment including a plurality of physical computing configured to communicate with an offload device.

FIG. 8 illustrates another embodiment of a virtual computing network comprising a plurality of physical computing devices 200. The physical computing devices 200 are in communication with a physical offload device 130 via a interconnect interface 206. In this embodiment, the physical computing device 100s are configured to share a common interconnect interface 206 that allows each of the physical computing device 100s to be in physical and electrical communication with the offload device 130. The interconnect interface 206 provides each of the physical computing devices 200 with a high speed, high bandwidth, and low latency connection to the offload device 130.

The offload device 130 can have a plurality of virtual offload devices 230 with each virtual offload device 230 associated with a specific physical computing device 200. In this embodiment, there are three physical computing devices 200 and three virtual offload devices 230 on the hardware offload device 130. The virtual offload devices 230 work in the same manner as the offload device 130 described in association with FIGS. 1 through 5. The offload device 130 can be partitioned between the three different devices and so there can be a partition of the device associated with each physical computing device 200.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or the entire signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computing system comprising:
 a physical computing device comprising a hardware interconnect interface, one or more processors and memory, wherein the one or more processors are configured to execute instructions that, upon execution, configure the physical computing device to:
  execute a virtual machine monitor configured to manage a virtual machine instance, wherein the virtual machine instance is assigned virtual processing resources and virtual memory resources corresponding to allocations of computing resources of the physical computing device;
 an offload device operably coupled to the physical computing device via the hardware interconnect interface, the offload device comprising:
  an offload device processor configured to execute instructions stored in offload device memory that, upon execution, configures the offload device to:
   instantiate one or more virtual input/output (I/O) components, wherein the virtual I/O components are configured to emulate one or more devices to perform at least one I/O function on behalf of the virtual machine instance, wherein the virtual I/O components are instantiated in the offload device memory;

wherein the virtual machine monitor is configured to provide addressing information associated with the one or more virtual I/O components to the virtual machine instance so that at least some of the I/O requests generated by the virtual machine instance are performed by the one or more virtual I/O components of the offload device.

2. The system of claim 1, wherein a portion of the plurality of virtual I/O components communicate directly with the virtual machine instance.

3. The system of claim 2, wherein the configuration of the plurality of virtual I/O components is based on the configuration of the virtual machine instances.

4. The system of claim 1, wherein a portion of the virtual components communicate with the virtual machine instance indirectly via the virtual machine monitor.

5. The system of claim 4, wherein the virtual machine monitor utilizes a translation table containing routing information for directing communication between the portion of the plurality of virtual I/O devices and the virtual machine instances.

6. The system of claim 1, wherein the interconnect interface is a Peripheral Component Interconnect Express interface.

7. The system of claim 1, wherein the virtual I/O components comprise at least one of are at least one of a storage controller, network interface controller, or a programmable interrupt controller.

8. A computer-implemented method comprising:
determining, by a virtual machine monitor, a configuration of a virtual machine instance, wherein the configuration of the virtual machine instance defines a plurality of virtual input/output (I/O) components associated with the virtual machine instance for instantiation on an offload device;
instantiating, by the virtual machine monitor, the virtual machine instance on the physical computing device, wherein the virtual machine instance is instantiated using the hardware computing resources of the physical computing device;
instantiating, by the offload device, at least a portion of the defined plurality of virtual I/O components associated with the virtual machine instance on the offload device, wherein the plurality of virtual I/O components are instantiated using the hardware computing resources of the offload device, wherein the portion of the virtual I/O components are configured to emulate one or more devices of the virtual machine instance; and
providing addressing information of the plurality virtual I/O components on the offload device to the virtual machine instance so that at least some of the I/O requests generated by the virtual machine instance are performed by the portion of the virtual I/O components.

9. The method of claim 8 further comprising:
receiving am I/O request from the virtual machine instance,
identifying routing information for a virtual I/O component of the plurality of based, at least in part, on a translation table; and
routing the I/O request to the virtual I/O component based, at least in part, on the identified routing information.

10. The method of claim 9, wherein the translation table is associated with a portion of the plurality of virtual I/O components.

11. The method of claim 8 further comprising instantiating a plurality of virtual machine instances on the physical computing device.

12. The method of claim 8 further comprising instantiating at least one virtual I/O device on the physical computing device.

13. The method of claim 8, wherein the addressing information comprises memory addresses of the offload device assigned to the virtual I/O component.

14. An offload device comprising:
an offload device configured to be coupled to a physical computing device via an interconnect interface on the physical computing device, the offload device comprising:
an offload device processor configured to execute instructions stored in offload device memory that, upon execution, configures the offload device to:
instantiate a plurality of virtual input/output (I/O) components based, at least in part, on configuration instructions, the virtual I/O components configured to emulate one or more physical I/O components, wherein the virtual I/O components are instantiated in the offload device memory, wherein each of the virtual I/O components are associated with a virtual machine instance hosted on the physical computing device, wherein the plurality virtual I/O components are configured to emulate one or more devices to perform at least one I/O function on behalf of the virtual machine instance hosted on the physical computing device;
process I/O requests using the virtual I/O components that are received to addressing information made available to one or more virtual machine instances and received via the interconnect interface.

15. The offload device of claim 14, wherein the configuration instructions are received from a control plane manager via a network.

16. The offload device of claim 14, wherein a portion of the plurality of virtual I/O devices communicate directly with the virtual machine instances using memory-mapped I/O.

17. The offload device of claim 14, wherein a portion of the virtual components communicate with the virtual machine instances indirectly via a virtual machine monitor on the physical computing device.

18. The offload device of claim 14, wherein the configuration instructions identify the virtual I/O components for instantiation on the offload device.

19. The offload device of claim 14, the virtual I/O components comprise at least one of are at least one of a storage controller, network interface controller, or a programmable interrupt controller.

20. The offload device of claim 14, wherein the addressing information comprises memory addresses of the offload device assigned to the virtual I/O component.

* * * * *